United States Patent Office 3,847,976
Patented Nov. 12, 1974

3,847,976
YIELD OF TRIMELLITIC ACID IMPROVED BY PHTHALIC ANHYDRIDES OR ITS PRECURSORS
George E. Kuhlmann, Downers Grove, Ill., assignor to Standard Oil Company, Chicago, Ill.
No Drawing. Filed Dec. 20, 1972, Ser. No. 316,859
Int. Cl. C07c 51/20, 63/32, 63/02
U.S. Cl. 260—524 R                                    3 Claims

ABSTRACT OF THE DISCLOSURE

Trimellitic acid in improved yield is obtained direct from oxidation of pseudocumene with molecular oxygen in oxidation zone having phthalic anhydride or its precursors present in addition to a liquid phase acetic acid solution of one or more heavy metal oxidation catalyst and bromide ion releasing bromine-containing compound. Particularly useful are phthalic anhydride and phthalic acid because, unlike their precursor o-xylene, they leave no partially oxidized intermediates.

BACKGROUND OF INVENTION

The discovery of the unique catalysis afforded by the acetic acid solution of the joint use of one or more heavy metal oxidation catalysts and a source of bromine for the liquid phase oxidation at a temperature from 50 to 275° C. of aliphatic-substituted aromatic compounds with molecular oxygen to aromatic polycarboxylic acid products was first disclosed in U.S. Pat. No. 2,833,816 which issued May 6, 1958. The use of said unique catalysis for such oxidation of di- and trimethylbenzenes under liquid phase conditions at 50 to 275° C. made feasible for the first time large scale commercial production of the benzene dicarboxylic acids: ortho-, iso- and terephthalic acids and tricarboxylic acids: trimellitic and trimesic acids. Since 1958 many improved modes of conduct of such oxidations using the unique combinations of heavy metal and bromine have been disclosed as advancements of that art. Some improvements were directed to yield improvement per unit of time and other improvements were directed to improved quality and yield of benzene polycarboxylic acid product. In general the improved modes of conduct for said liquid phase oxidation using the unique catalysis involved selective order of addition of catalyst components; scheduling addition of catalyst components; use of either constant temperature or constant pressure; scheduling different rates of oxygen supply; use of sources of oxygen having oxygen contents below and above the oxygen content of air; regulation of water content of acetic acid in the oxidation zone; sequentially staging of two or series connected oxidation zones operated at different temperatures, pressures, oxygen concentration or water concentration; usage of different combinations of heavy metals and types of bromine source, e.g. ionic and combined bromine; and combinations thereof as applied to batchwise, semi-continuous and continuous operations. Such improved modes of operation using the unique catalysis did provide for increase of benzene di- and tricarboxylic acid products from the yields demonstrated by the methods of U.S. Pat. No. 2,833,816. The oxidation of pseudocumene with oxygen gas at 50–120° C. in the presence of the unique catalysis goes not to the corresponding benzene tricarboxylic acid but rather produced mainly methylphthalic acids with substantial amounts of intermediate products between said methylphthalic acids and trimethylbenzenes. Oxidations under liquid phase conditions in the presence of the unique catalysis at temperatures above 120° C., i.e. in the range of 120 to 275° C., using oxygen gas or air as source of molecular oxygen did decrease the contaminating methylphthalic acids and intermediate oxidation products thereof from pseudocumene and did cause pseudocumene to be oxidized to trimellitic acid with attendant contamination by lessor amounts of methylphthalic acid and formylphthalic acids. The improved modes of conduct of the catalytic liquid phase oxidation did little to improve the low temperature (i.e. 50–100° C.) oxidations but did increase benzene di- and tricarboxylic acid product yields for the higher temperature oxidations.

To make more effective the unique catalysis for pseudocumene oxidation it is highly desirable to obtain said tricarboxylic acid direct from oxidation in a higher yield by use of some material in addition to such improved modes of conduct of liquid phase oxidation using the unique catalysis.

SUMMARY OF INVENTION

Trimellitic acid is obtained in higher yield by the oxidation of pseudocumene with molecular oxygen at a temperature in the range of 150 to 275° C. in an oxidation zone containing phthalic anhydride or its precursors o-xylene or phthalic acid in addition to the liquid phase acetic acid solution of heavy metal oxidation catalyst and bromine providing the unique catalysis. The use of phthalic anhydride or its above precursors increase the yields of trimellitic acid by over 10% and correspondingly reduce contaminant oxidation intermediates in trimellitic acid product. Phthalic anhydride and its above precursors are used in amounts within the range of 25 to 100 weight percent based on pseudocumene. Phthalic anhydride, phthalic acid and o-xylene can be added either with pseudocumene or preferably with the acetic acid solutions of catalyst components.

The amount of acetic acid used in the catalytic liquid phase oxidation can vary from 2 to 20 weight parts per weight part of pseudocumene. For the 150 to 275° C. temperature oxidation of pseudocumene there can be used cobalt, manganese mixtures of cobalt and manganese or cobalt, manganese and cerium in total metal concentrations of 0.01 to 1.0 weight percent and bromine concentrations of 0.01 to 1.0 weight percent based on the aromatic compound. Bromine can be provided by elemental bromine, ionic bromides such as hydrogen bromide, sodium bromide or ammonium bromide or by co-valent bromine-containing compounds which do not ionize to bromide ion such as potassium bromate, tetrabromoethane, benzylbromide or bromobenzene or bromoacetic acid but which provide bromide ion at the temperature at which the oxidation is conducted. Mixtures of ionic and co-valent bromine compounds can be used as sources of bromide ion for the oxidation.

The minimum pressure used in the oxidation zone is that pressure which will provide acetic acid in the liquid phase at temperatures of 150 to 275° C. The source of molecular oxygen oxidant can be any gas-containing molecular oxygen in concentrations from 10 to 100 volume percent such as air containing at least 50 volume percent oxygen or air enriched with oxygen gas or diluted with inert gas.

The catalytic liquid phase oxidations for which this invention provides the aforementioned beneficial improvement have their most practicable application at temperatures of 150–275° C. cobalt and manganese as catalyst metals and acetic acid to pseudocumene weight ratios of 2–10:1.0 and air as source of molecular oxygen. Trimellitic acid, which is quite soluble in acetic acid reaction solvent, is best recovered as its intramolecular anhydride by evaporation of acetic acid solvent, dehydrating the residue and fractionation of the dehydrated residue. However the success of any single oxidation can be readily evaluated merely by evaporation of acetic acid solvent and determining the trimellitic acid and its anhydride content of the residue.

The following illustrative examples are provided to enable one skilled in this art to understand and practice the present invention.

The illustrative example demonstrate the beneficial improvements afforded by the use of phthalic anhydride and its precursor o-xylene which forms phthalic acid and some phthalic anhydride in situ. These pseudocumene oxidations are made with air at a temperature of 420° F. and a pressure of 250 p.s.i.g. in the oxidation zone. The reactants and catalyst are:

| | |
|---|---|
| 100% Acetic Acid | 1313 Grams. |
| Water | 100 Grams. |
| Pseudocumene | 178 Grams. |
| Total Co and Mn metals | 0.35 Weight Percent. on Acetic Acid. |
| Bromine | 0.17 Weight Percent. on Acetic Acid. |

Pseudocumene, acetic acid solution of water and catalyst components are charged at ambient temperature and pressure to an oxidation vessel having a heating mantle, water cooled reflux condenser with pressure regulating valve in its discharge line, thermocouples to measure temperature in the oxidation zone, a valved inlet for injecting pressurized gas into the reaction mixture and a valved discharge for removal of fluid oxidation effluent from the vessel after termination of the oxidation at 20 volume percent oxygen (acetic acid free basis) in gases discharged from the reflux condenser. The oxidation vessel is sealed after charging pseudocumene and acetic acid solution, the pressure regulating valve set at 250 p.s.i.g. and the vessel pressurized to 250 p.s.i.g. with nitrogen injected through said valved inlet. The contents of the oxidation vessel are heated to the initial temperature later indicated and cooling water is supplied to the reflux condenser to operate it at the temperature of 200° F. Vapors of acetic acid and pseudocumene replace nitrogen gas which exits through the pressure regulating valve during heating of the oxidation vessel contents. After said contents are heated to the initial temperature, pressurized air is injected into the oxidation zone of the oxidation vessel through said valved gas inlet. Air injection is at a rate to provide sustained oxidation of pseudocumene and to provide oxygen (acetic acid free basis) content of 2–5 volume percent in gas discharged from the reflux condenser. Such oxygen content is monitored throughout the oxidation by an oxygen analyzer which uses a sample of the discharged gas after such gas sample has been taken through a trap cooled with solid $CO_2$ (Dry Ice) to trap out acetic acid not previously condensed before the sample is drawn into the oxygen analyzer.

Such oxidations of pseudocumene with and without the presence of phthalic anhydride or its precursors are further described by the data in the following table.

EFFECT OF PHTHALIC ANHYDRIDE AND ITS PRECURSORS ON PSEUDOCUMENE OXIDATION AT 250 P.S.I.G.

| Example number | Comparative | 1 | 2 |
|---|---|---|---|
| Phthalic anhydride added, grams | 0 | 0 | 100 |
| Precursors o-xylene added, grams | 0 | 90 | 0 |
| Temperature, ° F.: | | | |
| Initial | 370 | 370 | 380 |
| Maximum | 424 | 424 | 407 |
| Average | 420 | 420 | 400 |
| Reaction time, minutes | 50 | 68 | 52 |
| Trimellitic acid, weight percent | 124 | 132 | 135 |
| Equivalent o-phthalic acid, weight percent | | 93 | 98 |

The weight percent yield of trimellitic acid shown is based on 178 grams pseudocumene charged. The theoretical weight percent yield of trimellitic acid is 175 weight percent. Likewise the weight percent o-phthalic acid equivalent yield in Example 1 is based on the 90 grams o-xylene charged and the theoretical yield is 156 weight percent. The "equivalent o-phthalic acid" takes into account actual o-phthalic acid and its equivalent when phthalic anhydride is also present. In Example 2 the 98 weight percent equivalent phthalic acid indicates a small amount, about 2 grams, of phthalic anhydride lost during oxidation and recovery of products for analysis. The increase in trimellitic acid yield for Example 1 is about 8% and for Example 2 is about 11% over the Comparative oxidation yield. Results comparable to Example 2 can be achieved by adding o-phthalic acid as the phthalic anhydride precursor.

The invention claimed is:

1. A method of improving trimellitic acid yield by air oxidation of pseudocumene in the presence of a liquid phase acetic acid solution of heavy metal oxidation catalyst and bromine, which method consists essentially of conducting such oxidation also in the presence of oxidation promoting amounts of phthalic anhydride, o-phthalic acid or o-xylene.

2. The method of claim 1 wherein the oxidation promoting amount of phthalic anhydride is 25 to 100 weight percent of pseudocumene.

3. The method of claim 2 wherein the oxidating promoting amount of o-xylene is 50 to 60 weight percent of pseudocumene.

References Cited

UNITED STATES PATENTS 2,727,919  12/1955  Saunders _____ 260—524 R

FOREIGN PATENTS 646,646  8/1962  Canada _____ 260—524

LORRAINE A. WEINBERGER, Primary Examiner

R. D. KELLY, Assistant Examiner

U.S. Cl. X.R.

260—346.4